(12) United States Patent
Bockarev et al.

(10) Patent No.: US 11,804,703 B2
(45) Date of Patent: Oct. 31, 2023

(54) MOUNTING DEVICE, LINE SURGE ARRESTER UNIT AND METHOD FOR MOUNTING A LINE SURGE ARRESTER ON A POWER TOWER

(71) Applicant: Siemens Energy Global GmbH & Co. KG, Munich (DE)

(72) Inventors: Alexander Bockarev, Berlin Marzahn-Hellersdorf (DE); Maja Jolic, Berlin (DE); Bastian Robben, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 283 days.

(21) Appl. No.: 17/184,867

(22) Filed: Feb. 25, 2021

(65) Prior Publication Data

US 2021/0265829 A1    Aug. 26, 2021

(30) Foreign Application Priority Data

Feb. 25, 2020  (DE) .......................... 102020202407.3

(51) Int. Cl.
*H02G 13/00*   (2006.01)
*H01T 1/14*    (2006.01)
*H02G 7/20*    (2006.01)
*H02G 1/02*    (2006.01)

(52) U.S. Cl.
CPC ............... *H02G 13/80* (2013.01); *H01T 1/14* (2013.01); *H02G 1/02* (2013.01); *H02G 7/205* (2013.01)

(58) Field of Classification Search
CPC .......... H02G 13/80; H02G 1/02; H02G 7/205; H01T 1/14

USPC ......................................................... 361/117
See application file for complete search history.

(56) References Cited

U.S. PATENT DOCUMENTS

| 2,324,487 | A | * | 7/1943 | Davino | .................. A63H 21/02 104/94 |
| 3,259,762 | A | * | 7/1966 | Skuderna | ................. H02J 11/00 174/45 R |
| 2013/0134369 | A1 | | 5/2013 | Wabnegger | |

FOREIGN PATENT DOCUMENTS

| CA | 2805678 A1 | * | 1/2012 | .......... F16M 13/022 |
| CN | 201985500 U | | 9/2011 | |
| CN | 104361960 A | | 2/2015 | |
| DE | 1776070 U | | 10/1958 | |
| DE | 1132999 B | | 7/1962 | |

(Continued)

OTHER PUBLICATIONS

EP-2854242-A1, english translation.*

*Primary Examiner* — Yemane Mehari
(74) *Attorney, Agent, or Firm* — Laurence A. Greenberg; Werner H. Stemer; Ralph E. Locher

(57) ABSTRACT

A mounting device for mounting a line surge arrester on a power tower includes a base having at least one fastening structure for fastening to a tower-side component, and a joint unit for positioning the line surge arrester. The joint unit has a joint for pivoting the line surge arrester about a joint axis. At least one position is a mounting position and at least one other position is a working position of the line surge arrester. The mounting device furthermore has parts of a drive mechanism. The parts are permanently connected to the base and/or to the joint, for driving the pivoting of the line surge arrester. A line surge arrester unit includes a line surge arrester and the mounting device. A method provides for mounting a line surge arrester on a power tower.

10 Claims, 6 Drawing Sheets

(56) References Cited

FOREIGN PATENT DOCUMENTS

| | | | | |
|---|---|---|---|---|
| EP | 2854242 | A1 * | 4/2015 | ............... H01T 1/14 |
| EP | 2854242 | A1 | 4/2015 | |
| KR | 101429751 | B1 | 8/2014 | |

* cited by examiner

MOUNTING DEVICE, LINE SURGE ARRESTER UNIT AND METHOD FOR MOUNTING A LINE SURGE ARRESTER ON A POWER TOWER

CROSS-REFERENCE TO RELATED APPLICATION

This application claims the priority, under 35 U.S.C. § 119, of German Patent Application DE 10 2020 202 407.3, filed Feb. 25, 2020; the prior application is herewith incorporated by reference in its entirety.

BACKGROUND OF THE INVENTION

Field of the Invention

The invention relates to a mounting device for mounting a line surge arrester on a power tower and includes (i) a base which has at least one fastening structure for fastening to a tower-side component, and (ii) a joint unit for positioning the line surge arrester, in which the joint unit has a joint for pivoting the line surge arrester about a corresponding joint axis, at least one of the positions is a mounting position and at least one other position is a working position of the line surge arrester.

The invention furthermore relates to a corresponding line surge arrester unit including a line surge arrester and the mounting device, and to a corresponding method for mounting a line surge arrester on a power tower.

In an electricity transmission system, in particular in high-voltage systems with voltages in excess of 1 kV, line surge arresters are connected in parallel to a line insulator of the overhead line. They include at least one surge arrester element including non-linear metal-oxide resistors in a porcelain or plastic housing. Line surge arresters are preferably used where, due to absent or insufficient overhead ground wire protection and/or high tower grounding surge resistances, back flashovers are a frequent occurrence. The installation of line surge arresters on all or only some towers is often a cost-effective alternative to improving overhead ground wire protection or tower grounding conditions for the subsequent increase in reliability of supply on existing transmission or distribution lines. Line surge arresters are employed both in technology without spark gaps (NGLA: non-gapped line arresters) and in conjunction with an external series spark gap (EGLA: externally gapped line arresters) which, in normal operation, insulate the line surge arresters against switching overvoltages or in the event of a line overload.

The use of line surge arresters is an effective and economically expedient way of protecting both existing transmission lines and transmission lines to be newly constructed against lightning overvoltages and therefore of increasing the system safety and line availability. Fields of application for line surge arresters include, in particular, line regions with poor tower grounding resistances, areas with increased lightning activity, overhead lines without overhead ground wire protection and overhead lines with more stringent requirements in respect of their availability.

European Patent Application EP 2 854 242 A1 describes a mounting device for mounting a line surge arrester on an overhead line tower, including (i) a base, which has at least one fastening structure for fastening to a tower-side component, and (ii) a joint unit for positioning the line surge arrester, which joint unit has a joint for pivoting the line surge arrester about a corresponding pivot axis, wherein at least one of the positions is a mounting position and at least one other position is a working position of the line surge arrester.

A line surge arrester for a high-voltage system with voltages of several hundred kV has a considerable size and significant weight, making it difficult to handle a line surge arrester of that kind on the tower.

BRIEF SUMMARY OF THE INVENTION

It is accordingly an object of the invention to provide a mounting device, a line surge arrester unit and a method for mounting a line surge arrester on a power tower, which overcome the hereinafore-mentioned disadvantages of the heretofore-known devices, units and methods of this general type and with which mounting of a relatively large and heavy line surge arrester can also still be carried out in a relatively simple manner.

With the foregoing and other objects in view there is provided, in accordance with the invention, a mounting device for mounting a line surge arrester on a power tower, comprising a base, which has at least one fastening structure for fastening to a tower-side component, and a joint unit for positioning the line surge arrester, which joint unit has a joint for pivoting the line surge arrester about a corresponding joint axis, wherein at least one of the positions is a mounting position and at least one other position is a working position of the line surge arrester, in which provision is made for this mounting device to furthermore have parts of a drive mechanism, which parts are permanently connected to the base and/or to the joint, for driving the pivoting of the line surge arrester. In other words, the mounting device includes a permanently mounted or partially releasable drive mechanism. This drive mechanism is part of a drive for pivoting the line surge arrester. This drive can be a manual drive or a mechanical drive, for example driven by an electrical machine.

During the corresponding mounting, the line surge arrester is fastened to a tower-side component in a mounting position by the mounting device and moved from this mounting position to a working position of the mounting device by the drive. Important components of the drive, specifically the mechanism or its parts, are already present on the mounting device.

The mounting device allows mounting of a line surge arrester to be carried out in a relatively simple manner even for line surge arresters which are provided for high-voltage systems which have voltages U of several hundred kV (for example voltages in the range of 200 kV≤U≤1200 kV).

According to a preferred embodiment of the invention, the drive mechanism is constructed in the form of a toggle lever configuration which also has, in addition to the joint, at least two lever elements, which are connected to one another in an articulated manner by the joint, as parts of the drive mechanism. Preferably, at least one of the lever elements is pivotably mounted and the line surge arrester is fastened to this pivotable lever element. The other lever element is preferably a lever element which is fixed to the device (with respect to the mounting device).

In this case, provision is made, in particular, for the drive mechanism to furthermore include a drive spindle which acts on the lever elements. This drive spindle is permanently mounted or mounted in a releasable or removable manner. In each of these cases, the lever elements are constructed for correspondingly interacting with the drive spindle.

In this refinement, driving is performed as manual driving or as mechanical driving by the drive spindle. In the case of manual driving, a drive crank which is connected or can be connected in a rotationally fixed manner to the spindle is furthermore provided for this purpose. In this case, the drive spindle and the drive crank form, in particular, an assembly of the drive.

According to a further preferred embodiment of the invention, the mounting device has a suspension including at least one insulator by which the line surge arrester can be fixed in the at least one working position. Therefore, the line surge arrester is additionally held by this suspension in the at least one working position.

In this case, provision is advantageously made for the suspension to have at least one carrying element which is fixed to the base and includes holding structures which form a plurality of possible suspension points for suspending the line surge arrester by the at least one insulator. In this way, a plurality of different working positions or correction/adjustment of the one working position can be implemented.

In this context, provision is made for the suspension to have two carrying elements which are fixed to the base and to have a crossmember which can be positioned in the structures which correspond to the different suspension points. Two insulators are generally also used when the suspension is constructed in this way.

With the objects of the invention in view, there is also provided a line surge arrester unit, comprising a line surge arrester and a mounting device for mounting the line surge arrester on a power tower, in which provision is made for the mounting device to be constructed as an above-mentioned mounting device. The corresponding line surge arrester is, in particular, a line surge arrester for use in conjunction with an external spark gap (EGLA: externally gapped line arrester).

With the objects of the invention in view, there is furthermore provided a method for mounting a line surge arrester on a power tower by using a mounting device, the method comprising using the mounting device so that the line surge arrester:

(a) is fastened to a tower-side component in a mounting position, and
(b) is moved from this mounting position to a working position by a drive which has a drive mechanism.

In this case, the mounting device is constructed as an above-described mounting device which has at least parts of this drive mechanism. In other words, the method according to the invention describes the use of the above-described mounting device for mounting a line surge arrester on a power tower.

In this case, an embodiment of the method according to the invention makes provision for the line surge arrester to be disposed in a substantially vertically oriented manner on a part of the drive mechanism in the mounting position. In the working position, the line surge arrester then generally hangs from the tower or the tower-side component.

Other features which are considered as characteristic for the invention are set forth in the appended claims.

Although the invention is illustrated and described herein as embodied in a mounting device, a line surge arrester unit and a method for mounting a line surge arrester on a power tower, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
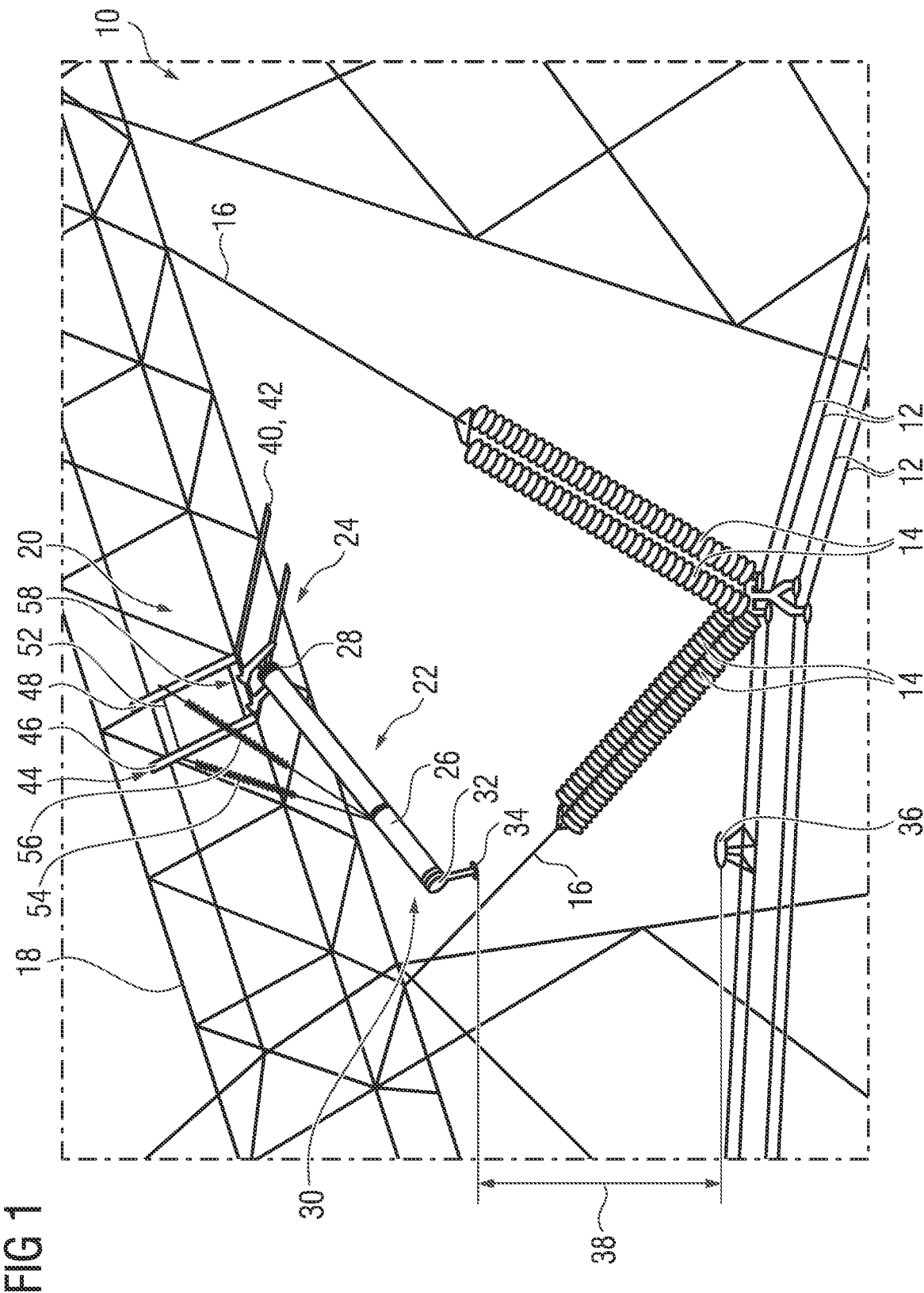
FIG. 1 is a fragmentary, diagrammatic, perspective view of an overhead line tower having overhead lines which are suspended from the actual tower by insulators and having a line surge arrester unit including a line surge arrester and a mounting device according to a preferred refinement of the invention.

Referring now to the figures of the drawings in detail and first, particularly, to FIG. 1 thereof, there is seen a power tower 10 having lines 12 which are suspended from the power tower 10 by insulators 14 and a corresponding suspension 16. In this case, the different lines 12 can correspond to different phases. The resulting configuration of the insulators 14 corresponds to a V shape. This is produced by two outer suspension points (not directly shown) of the suspension 16. In this case, in the example, these suspension points are located on the different sides of a tower arm of the power tower 10. This tower arm is also referred to below as a tower-side component 18. A line surge arrester unit 20 including a line surge arrester 22 and a mounting device 24 for mounting the line surge arrester 22 on the power tower 10 is fastened to the tower arm or tower-side component 18. The suspension points of the suspension 16 for the lines 12 are at a considerable distance from the mounting position of the mounting device 24.

The line surge arrester 22 has an elongate main body 26 which generally includes surge arrester elements including non-linear metal-oxide resistors in a porcelain or plastic housing. The main body 26 is fastened to the mounting device 24 by way of one end 28 and its other end is a free end 30. An end fitting 32 and a spark electrode 34 are located at this free end 30. A corresponding high-voltage electrode 36 is located on the associated lines 12. The line surge arrester 22 shown in this case is a line surge arrester 22 for use in conjunction with an external series spark gap (EGLA, externally gapped line arrester). The corresponding spark gap 38 is formed between the two electrodes (spark electrode 34 and high-voltage electrode 36).

The mounting device 24 has, for the purpose of mounting the line surge arrester 22 on the power tower 10, in the first instance a base 40 which is constructed as a frame 42 in the example. Furthermore, the mounting device 24 has a suspension 44, which is fastened to this base 40, for suspending the line surge arrester 22. In the example, this suspension 44 has two carrying elements 46, 48 which are constructed as carrying arms and on each of which holding structures 50 (which can be clearly seen in FIG. 2) are formed, it being possible for different holding points for holding the line surge arrester 22 in different positions to be implemented by the holding structures. A crossmember 52 of the suspension 44 can be positioned in the structures 50 (which correspond to the different suspension points). The line surge arrester 22 is suspended from each of the two ends of the crossmember 52 by a respective insulator 54, 56.

Figure 2:
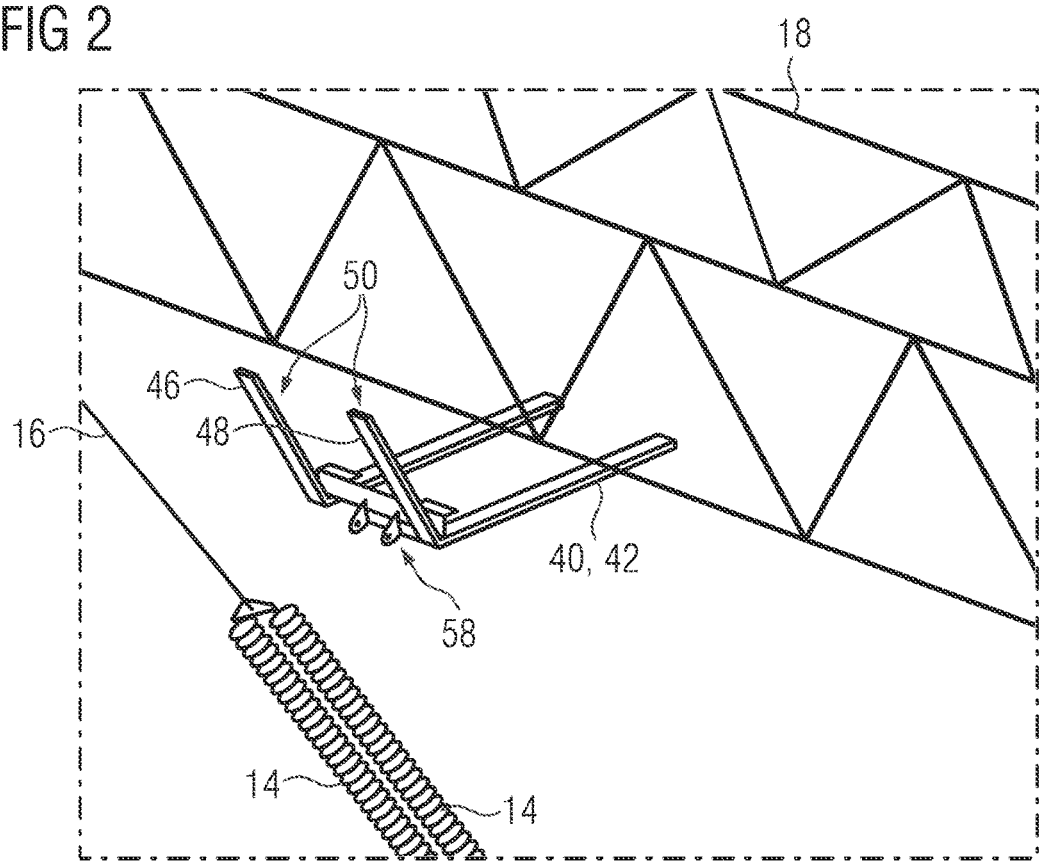
FIG. 2 is an enlarged, fragmentary, perspective view of the mounting device and parts of the tower in the vicinity of the mounting position of the mounting device.

FIG. 2 shows the mounting device and parts of the tower in the vicinity of the mounting position of the mounting device 24. In addition to the mentioned details of the mounting device 24, such as the base 40 and the carrying elements 46, 48 of the suspension 44 for the line surge arrester 22, parts of a joint unit 58 for positioning the line surge arrester 22 by a pivoting movement are also shown.

Figure 3:
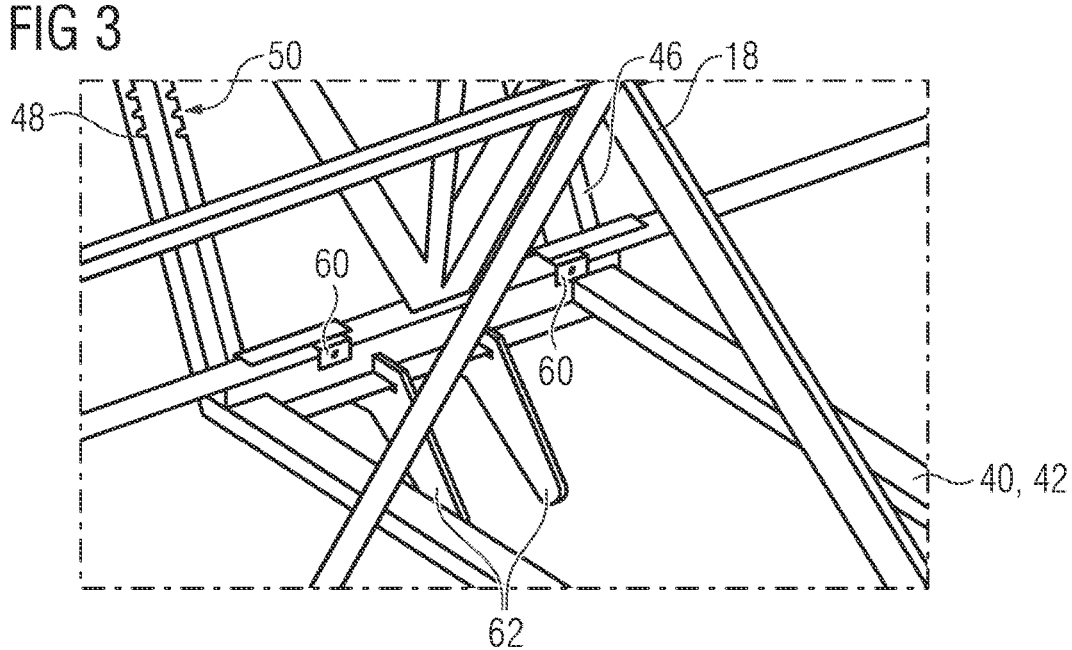
FIG. 3 is a further enlarged, fragmentary, perspective view of details of the mounting device.

FIG. 3 shows a number of details of the mounting device 24. In addition to fastening structures 60 for fastening the mounting device 24 to the tower 10 or a tower-side component 18 (in this case to the tower arm), a lever element 62 which is fixed to the device can also be seen. The function of the lever element 62 is described in conjunction with FIG. 4. The fastening structures 60 are screw configurations or screw connections in this case in the example.

The base 40 and the carrying elements 46, 48 of the suspension 44 are together constructed as a frame 42. Some of the holding structures 50 which are constructed as recesses and into which the crossmember 52 (not shown herein) can be inserted are likewise illustrated in detail.

Figure 4:
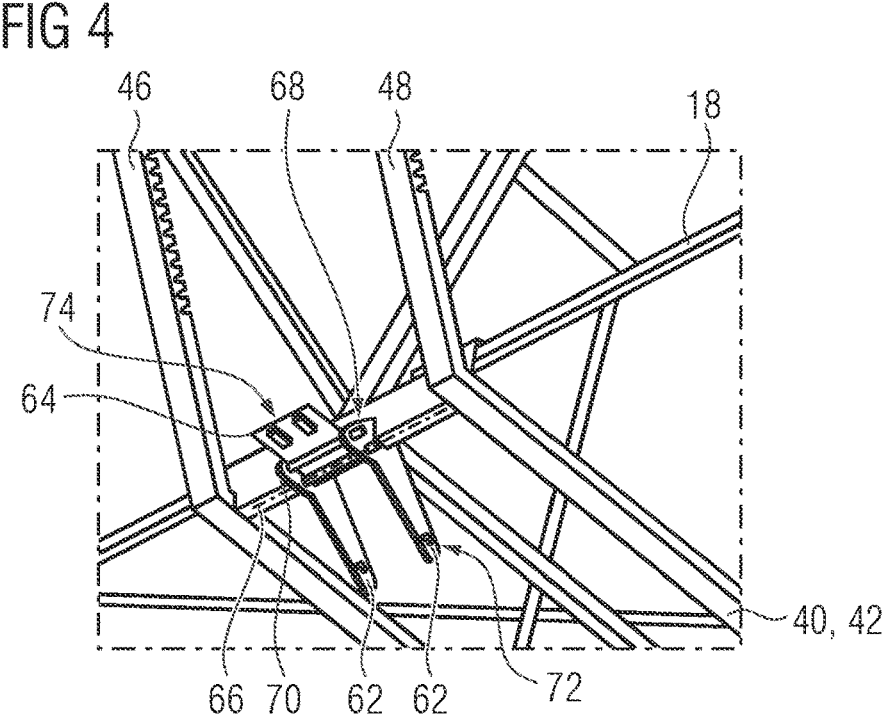
FIG. 4 is a fragmentary, perspective view of further details of the mounting device.

FIG. 4 shows further details of the mounting device 24. In addition to the components of the frame 42 which form the base 40 and the suspension 44 and the lever element 62 which is fixed to the device, the interaction with the above-mentioned joint unit 58 can now be seen too. In addition to the lever element 62 which is fixed to the device, there is a further lever element 62 which can be pivoted about a corresponding joint axis 66 of a joint 68 of the joint unit 58. The pivotable lever element 64 is fixed in the position shown herein by a splint 70. This splint 70 can selectively also be removed again. The two lever elements 62, 64 are then connected in an articulated manner by the joint 68. A respective fastening structure 72, 74, by which a drive spindle 76 (shown in FIG. 6) can interact with the lever elements 62, 64, is formed on/in each of the lever elements 62, 64.

Figure 5:
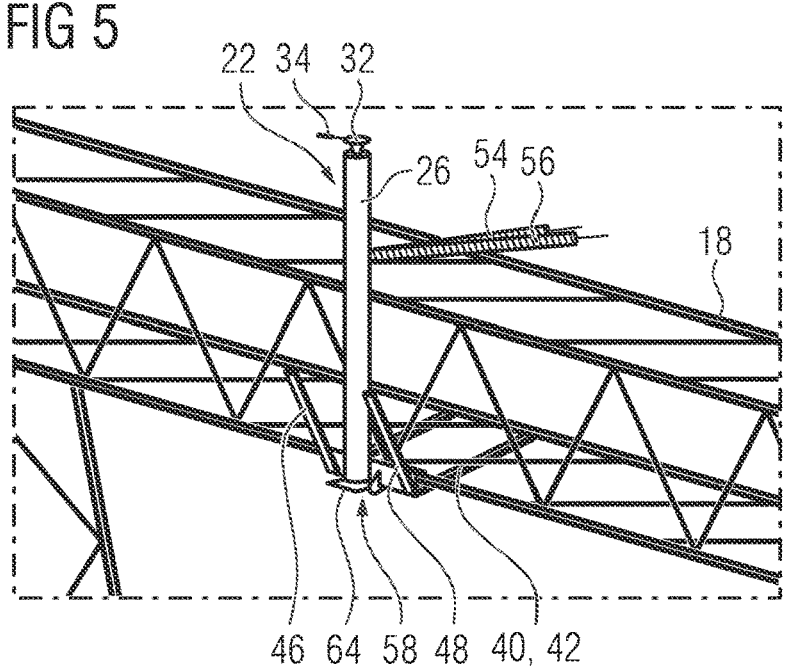
FIG. 5 is a fragmentary, perspective view of the line surge arrester which is mounted by the mounting device in a mounting position.

FIG. 5 shows the line surge arrester 22 which is mounted by the mounting device 24 in a mounting position. In this case, the line surge arrester 22 is in a vertical position on the pivotable lever element 64. This pivotable lever element 64 is oriented in a manner fixed in a horizontal position to the line surge arrester by the splint 70.

Figure 6:
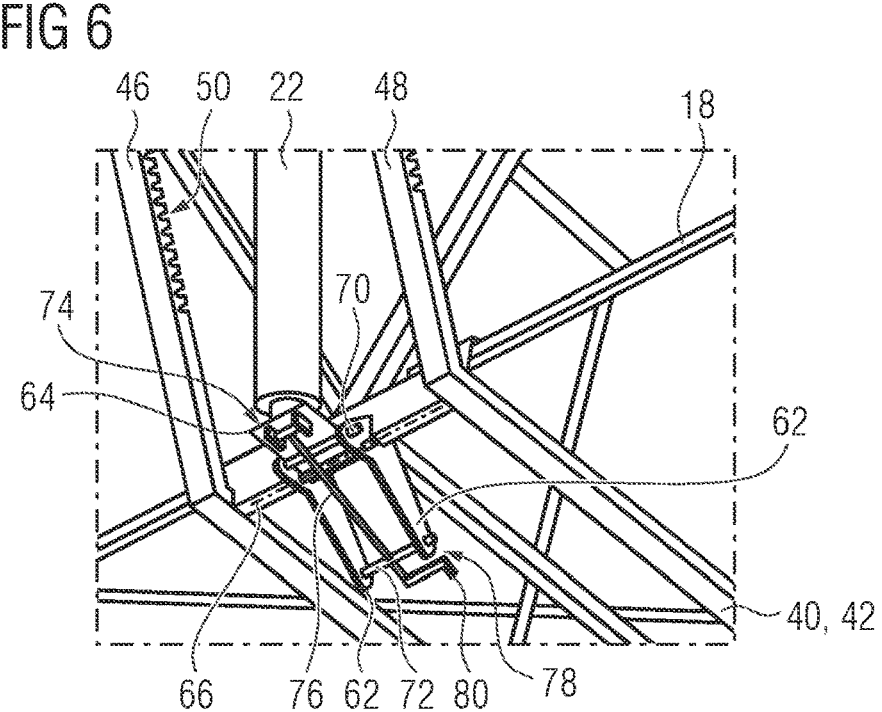
FIG. 6 is a fragmentary, perspective view of details of the mounting device when the line surge arrester is in the mounting position.

FIG. 6 shows details of the mounting device 24 when the line surge arrester 22 is in the mounting position. The drive spindle 76 mentioned above in conjunction with FIG. 4 is then mounted between the lever elements 62, 64. A drive crank 80 is fitted to a free end of this drive spindle 76.

Figure 7:
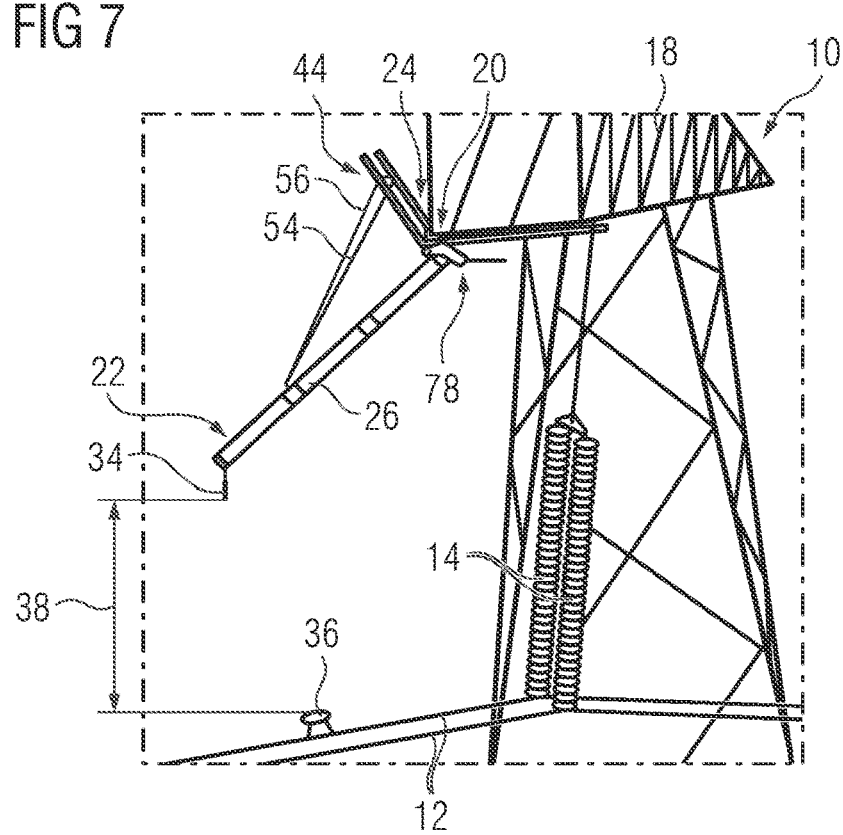
FIG. 7 is a fragmentary, perspective view of a complete overview with the line surge arrester which is mounted by the mounting device in the working position.

The joint 68 of the joint unit 58 serves to pivot the line surge arrester 22 about the corresponding joint axis 66, wherein one of the positions which can be set by the pivoting is the mounting position shown in FIG. 5 and another of these positions is the working position of the line surge arrester 22 shown in FIG. 7. For this purpose, the mounting device 24 has a drive mechanism 78 for driving the pivoting of the line surge arrester 22, which drive mechanism is constructed in the form of a toggle lever configuration. The drive mechanism 78 also has, in addition to the joint 68, the two lever elements 62, 64 which are connected to one another in an articulated manner by the joint 68 as parts. These parts 62, 64 are permanently connected to the base 40 or to the joint 68 while further parts, such as the drive spindle 76 of the drive mechanism 78 and the drive crank 80, are releasably fastened.

FIG. 7 shows a general overview with the line surge arrester 22 which is mounted by the mounting device 24 in the working position and with the lines 12. The illustrated view corresponds to the view in FIG. 1, but is illustrated from a different perspective. The spark gap 38 between the spark electrode 34 at the free end 30 of the line surge arrester 22 and the high-voltage electrode 36 which is installed on the lines 12 can also be seen herein once again.

Figure 8:
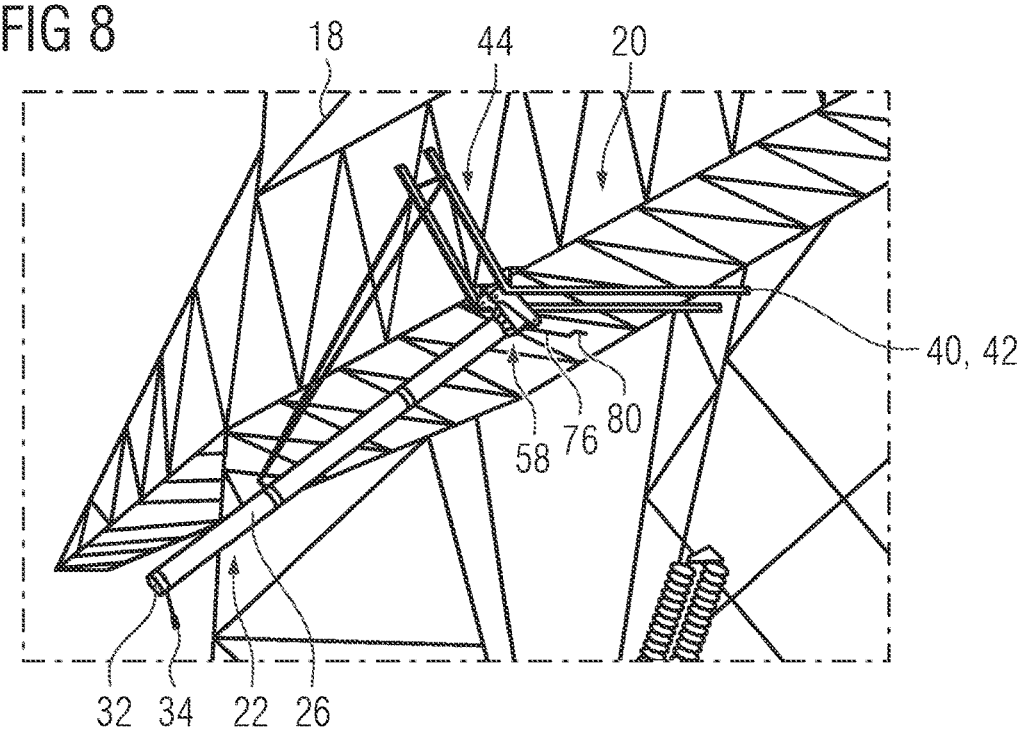
FIG. 8 is a further fragmentary, perspective view of the line surge arrester which is mounted by the mounting device in the working position.

FIG. 8 shows a further view of the line surge arrester 22 which is mounted by the mounting device 24 in the working position. The end fitting 32 and the spark electrode 34 at the free end 30 of the line surge arrester 22, the spindle 76 of the drive mechanism 78 and the drive crank 80 can be clearly seen therein.

Figure 9:
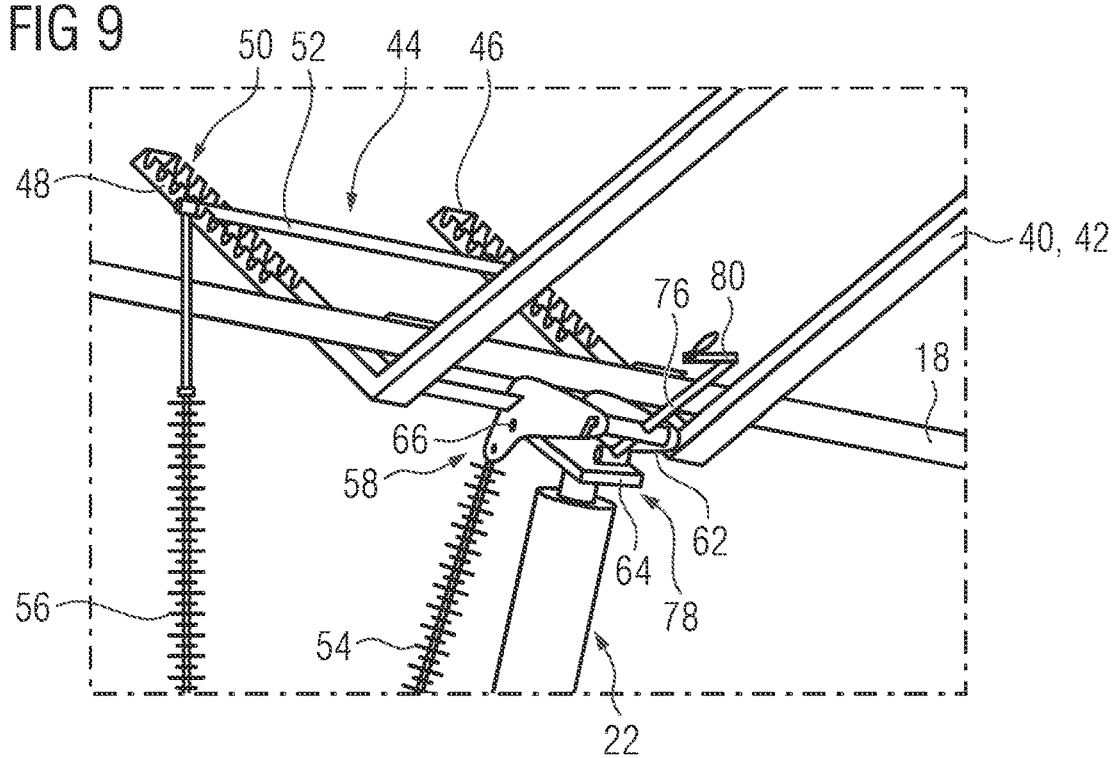
FIG. 9 is a fragmentary, perspective view of details of the mounting device during mounting.

FIG. 9 shows details of the mounting device 24, more precisely of the drive mechanism 78, during mounting. In this case, the drive spindle 78 and the drive crank 80 are (still) mounted. Therefore, the drive mechanism 78 together with its toggle lever configuration is completely mounted. In this form, it can be used to pivot the lever element 64 and the line surge arrester 22 which is mounted on it.

In order to mount the line surge arrester 22 on the power tower 10, the line surge arrester 22 is initially fastened to the tower-side component 18 in the mounting position shown in FIG. 5 by the mounting device 24, and then moved from this mounting position to the working position shown in FIGS. 1 and 7 by a (in this case manual) drive which includes the drive mechanism 78.

In this case, the line surge arrester 22 is disposed in a substantially vertically oriented manner on a part 64 of the drive mechanism 78 in the mounting position. In the working position, the line surge arrester 22 then hangs from the tower 10 or the tower-side component 18. For this purpose, the mounting device 24 has, amongst other things, the suspension 44. The line surge arrester 22 hangs firstly from the joint unit 58 and secondly from the carrying elements 46, 48 of the suspension 44 in the working position.

The mounting device 24 allows mounting of a line surge arrester 22 to be carried out in a relatively simple manner even for line surge arresters 22 for high-voltage systems which have voltages U of several hundred kV (for example 750 kV).

Figure 10:
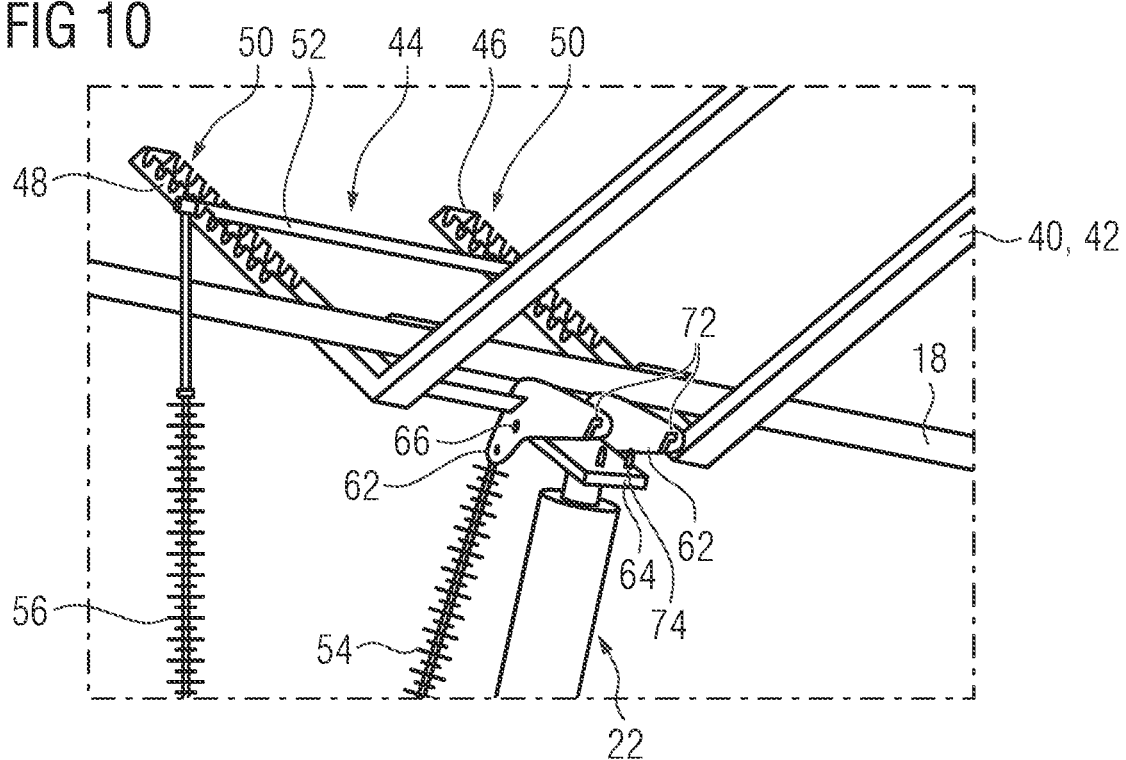
FIG. 10 is a fragmentary, perspective view of details of the mounting device after mounting.

Finally, FIG. 10 shows details of the mounting device 24 after mounting has taken place. In comparison to the situation as is illustrated in FIG. 9, the drive spindle 76 and the drive crank 80 of the drive are now removed. They form a kind of tool which can then be used for mounting another line surge arrester 22.

The invention claimed is:

1. A mounting device for mounting a line surge arrester on a power tower, the mounting device comprising:

a base having at least one fastening structure to be fastened to a tower-side component; and a joint unit for positioning the line surge arrester, said joint unit having a joint for pivoting the line surge arrester about a corresponding joint axis between positions, at least one of said positions being a mounting position and at least one other of said positions being a working position of said line surge arrester; and a drive mechanism having parts permanently connected to at least one of said base or said joint for driving the pivoting of the line surge arrester.

2. The mounting device according to claim 1, wherein said drive mechanism is a toggle lever configuration including, in addition to said joint, at least two lever elements connected to one another in an articulated manner by said joint as parts of said drive mechanism.

3. The mounting device according to claim 2, wherein said drive mechanism includes a drive spindle acting on said at least two lever elements.

4. The mounting device according to claim 3, which further comprises a drive crank connected or configured to be connected in a rotationally fixed manner to said drive spindle.

5. The mounting device according to claim 1, which further comprises a suspension including at least one insulator configured to fix the line surge arrester in the working position.

6. The mounting device according to claim 5, wherein said suspension has at least one carrying element fixed to said base, said at least one carrying element including holding structures forming a plurality of possible suspension points for suspending the line surge arrester on said at least one insulator.

7. The mounting device according to claim 6, wherein said at least one carrying element includes two carrying elements fixed to said base, said two carrying elements having a crossmember to be positioned in said holding structures corresponding to said possible suspension points.

8. A line surge arrester unit, comprising:

a line surge arrester; and a mounting device according to claim 1 for mounting said line surge arrester on a power tower.

9. A method for mounting a line surge arrester on a power tower, the method comprising:

using a mounting device according to claim 1 to mount the line surge arrester on the power tower;

using the mounting device to fasten the line surge arrester to a tower-side component in a mounting position; and using a drive mechanism of a drive of the mounting device to transfer the line surge arrester from the mounting position to a working position, the mounting device having at least parts of the drive mechanism.

10. The method according to claim 9, which further comprises placing the line surge arrester in a substantially vertically oriented position on a part of the drive mechanism in the mounting position.

* * * * *